United States Patent [19]

Matl

[11] Patent Number: 4,886,227

[45] Date of Patent: Dec. 12, 1989

[54] INDICATING INSTRUMENT

[75] Inventor: Helmut Matl, Gross Umstadt, Fed. Rep. of Germany

[73] Assignee: VDO Adolf Schindling AG, Frankfurt am Main, Fed. Rep. of Germany

[21] Appl. No.: 341,146

[22] Filed: Apr. 20, 1989

[30] Foreign Application Priority Data

Aug. 26, 1988 [DE] Fed. Rep. of Germany ....... 3828910

[51] Int. Cl.[4] .............................................. G12B 9/00
[52] U.S. Cl. .................................. 248/27.1; 361/417; 439/547
[58] Field of Search .............. 248/27.1; 361/397, 415, 361/417, 429; 174/58; 439/547, 549

[56] References Cited

U.S. PATENT DOCUMENTS

| | | | |
|---|---|---|---|
| 3,955,124 | 5/1976 | Jones | 439/547 X |
| 4,227,238 | 10/1980 | Saito | 361/417 X |
| 4,348,899 | 9/1982 | Muller | 248/27.1 X |
| 4,560,839 | 12/1985 | Dillard | 439/547 X |
| 4,573,104 | 2/1986 | Kamada | 361/415 X |
| 4,667,270 | 5/1987 | Yagi | 361/417 X |
| 4,702,711 | 10/1987 | Falchi | 248/27.1 X |
| 4,725,919 | 2/1988 | Dijaux | 361/397 X |

Primary Examiner—J. Franklin Foss
Attorney, Agent, or Firm—Martin A. Farber

[57] ABSTRACT

In an indicating instrument, a plurality of measuring elements (2,3) are fastened in axially displaceable manner on a base plate (1) and held by compression springs (4,5) against a front plate (6) of a housing (7). The measuring elements (2,3) are provided on their rear with contact pins (9,10,11) which pass through a base plate (1) of the indicating instrument and, behind it, engage, in each case, in a plug-type receiver (12,13,14) of a circuit board (15).

7 Claims, 1 Drawing Sheet

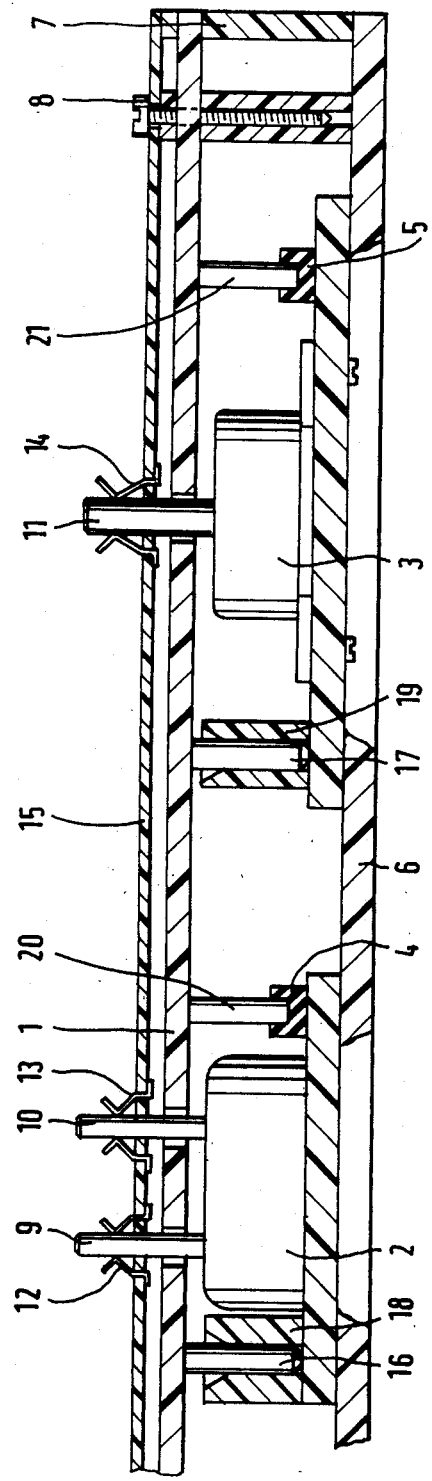

INDICATING INSTRUMENT

FIELD AND BACKGROUND OF THE INVENTION

The present invention relates to an indicating instrument having a base plate and a front plate between which at least one measuring element is fastened, the measuring element with contact pins being passed through the base plate and contacting a circuit board which extends behind the base plate.

Such indicating instruments are generally known and customary, and may be employed in a motor vehicle.

Ordinarily the contact pins of the measuring element of such an indicating instrument are provided with a thread so that a nut can be screwed onto each of them in order to fasten the corresponding measuring instrument to the base plate. The contact pins are therefore at the same time attachment screws for the measuring element. This manner of attaching the measuring elements to the base plate has the disadvantage that, depending on the existing manufacturing tolerances, a smaller or larger space remains between the front plate and the front face of the measuring element. Such indicating instruments are illuminated indirectly from their rear, so that undesired stray light passes through such space onto the front of the indicating instrument. In unfavorable cases, rattling noises can also occur if the measurement element is periodically struck by the front plate due to vibration of the vehicle.

SUMMARY OF THE INVENTION

Accordingly, it is an object of the invention to develop an indicating instrument of the aforementioned type in such a manner that, in the simplest possible way, play between its front plate and the measurement element or elements provided in it is avoided.

Accordingly, the invention provides that the measuring element (2,3) be held by the base plate (1) in a manner trasversely displaceable to the base plate (1) and be clamped against the front plate (6) by at least one compression spring (4,5).

As a result of this development, the measuring element always lies with initial stress against the front plate. This excludes any air space between the measuring element and the rear of the front plate so that stray light cannot reach the front side of the indicating instrument and rattling cannot occur. If several measuring elements are provided in an indicating instrument then the compression springs compensate for tolerances. As the result of the compression springs of the invention, a vibration-free firm seat of the measuring element is assured.

Particularly in the case of indicating instruments having a plurality of measuring elements, for instance a speedometer, a tachometer and a bimetallic instrument, it is advantageous if, in accordance with another feature of the invention, a circuit board (15) for the contacting of the contact pins (9–11) be provided with plug-in sockets (12–13). The individual measuring elements make reliable electrical contact with a conductor path even if they penetrate to different distances through the conductor path as a result of tolerances.

Each measuring element is held axially in displaceable manner on the base plate in particularly simple fashion if the measuring element (2,3) engages, via guide sleeves (18,19) provided on the measuring element, over guide pins (16,17) of the base plate (1) or via guide pins, provided on the measurement element, into guide sleeves provided on the base plate (1).

In principle, any measuring element could, for instance, be clamped against the front plate by, for instance, a coil compression spring arranged between its rear or a flange-like rim and the base plate. However, the indicating instrument is of particularly simple development if, in accordance with a preferred feature of the invention, a total of two rubber caps are provided as compression springs (4,5) for each measuring element (2,3), the front sides of the caps resting against a rear surface of the measuring element (2,3), and the caps being placed on the free end of a support pin (20,21) protruding from the base plate (1).

The invention permits of numerous embodiments.

BRIEF DESCRIPTION OF THE DRAWING

In order to make its basic principle clear, one such embodiment is shown diagrammatically in the drawing and will be described below, the only figure of the drawing being a section through a part of an indicating instrument in accordance with the invention.

DETAILED DESCRIPTION OF THE PREFERRED EMBODIMENT

The drawing shows part of a base plate 1 on which two measuring elements 2,3 are held for axial displacement. Each of these measuring instruments 2,3 is pressed by a respective compression spring 4,5—which springs may, in this embodiment, consist of rubber caps—against a front plate 6 which is common to the measuring elements 2,3. The front plate 6 may also be an instrument dial. In this embodiment, the front plate 6 is part of a housing 7 against which the base plate 1 is held by attachment screws 8.

The measuring elements 2,3 are provided on their rear with contact pins 9,10,11 which are passed through the base plate 1 and engage, in each case, in a plug-type receiver 12,13,14 of a circuit board 15 which is arranged behind the base plate 1 and spaced from it, being held there by attachment screws 8.

A plurality of guide pins 16,17 extend from the base plate 1 to the measuring elements 2,3. The latter engage via guide sleeves 18,19 over these guide pins 16,17 so that the measuring instruments are held in axially displaceable manner on the base plate 1. In actual use, at least two guide sleeves 18,19 and two guide pins 16,17 are provided for each measuring element 2,3.

The base plate 1, furthermore, has support pins 20,21 directed against a flange-like rim of the measuring instruments 2,3 and on each of which there is placed one of the compression springs 4,5 having the form of a rubber cap. At least two support pins 20,21 are also provided in actual use for each measuring element 2,3.

I claim:

1. An indicating instrument comprising
   at least one measuring element;
   a circuit board;
   a base plate and a front plate between which said at least one measuring element is fastened, the measuring element having contact pins to be passed through the base plate for contacting the circuit board, the circuit board extending behind the base plate;
   at least one compression spring; and wherein
   the measuring element is held by the base plate and said at least one compression spring, said at least one compression spring allowing transverse displacement of the measuring element along the base plate and clamping the measuring element against the front plate.

2. An indicating instrument according to claim 1, wherein
the circuit board has plug-in sockets for contacting the contact pins.

3. An indicating instrument according to claim 2, further comprising
guide sleeves secured to the measuring element; and
guide pins secured to the base plate; and wherein
the measuring element engages the base plate via the guides passing over the guide pins.

4. An indicating instrument according to claim 2, further comprising
guide pins secured to the measuring element; and
guide sleeves secured to the base plate; and wherein
the measuring element engages the base plate via the guides passing over the guide pins.

5. An indicating instrument according to claim 1, wherein
guide sleeves secured to the measuring element; and
guide pins secured the base plate; and wherein
the measuring element engages the base plate via the guides passing over the guide pins.

6. An indicating instrument according to claim 1, further comprising
guide pins secured to the measuring element; and
guide sleeves secured to the base plate, and wherein
the measuring element engages the base plate via the guides passing over the guide pins.

7. An indicating instrument according to claim 1, further comprising
a support pin protruding from the base plate, and a second compression spring; and wherein
the two compression springs comprise a total of two rubber caps for each measuring element, the front sides of the caps resting against a rear surface of the measuring element, the caps being placed on the free end of the support pin prortruding from the base plate.

* * * * *